(12) United States Patent
Feldmann

(10) Patent No.: US 6,792,109 B1
(45) Date of Patent: Sep. 14, 2004

(54) BIT GENERATOR FOR DETERMINING A SECRET ENCRYPTION KEY AND CORRESPONDING PROCESS

(75) Inventor: Michel Feldmann, Paris (FR)

(73) Assignee: France Telecom, Paris (FR)

( * ) Notice: Subject to any disclaimer, the term of this patent is extended or adjusted under 35 U.S.C. 154(b) by 836 days.

(21) Appl. No.: 09/585,348

(22) Filed: Jun. 2, 2000

(30) Foreign Application Priority Data

Jun. 4, 1999 (FR) .......................................... 99 07084

(51) Int. Cl.[7] .......................... H04L 9/00; G06F 11/30
(52) U.S. Cl. .......................... 380/44; 380/37; 713/194
(58) Field of Search .......................... 380/37, 44, 265; 713/194; 333/193, 154, 196

(56) References Cited

U.S. PATENT DOCUMENTS

| | | | | |
|---|---|---|---|---|
| 3,798,359 A | * | 3/1974 | Feistel | 380/37 |
| 4,195,200 A | * | 3/1980 | Feistel | 380/37 |
| 5,297,207 A | * | 3/1994 | Degele | 380/46 |
| 5,515,307 A | | 5/1996 | Aiello et al. | |
| 5,796,836 A | * | 8/1998 | Markham | 380/28 |
| 5,799,088 A | * | 8/1998 | Raike | 380/30 |
| 6,104,811 A | * | 8/2000 | Aiello et al. | 380/46 |
| 6,154,451 A | * | 11/2000 | Zscheile et al. | 370/318 |
| 6,154,541 A | * | 11/2000 | Zhang | 380/28 |
| 6,304,658 B1 | * | 10/2001 | Kocher et al. | 380/30 |
| 6,334,190 B1 | * | 12/2001 | Silverbrook et al. | 713/500 |
| 6,374,354 B1 | * | 4/2002 | Walmsley et al. | 713/167 |

FOREIGN PATENT DOCUMENTS

| | | | | |
|---|---|---|---|---|
| GB | 2352372 A | * | 1/2001 | H04L/9/00 |
| WO | WO 97/44936 | | 11/1997 | |

* cited by examiner

Primary Examiner—Gilberto Barrón
Assistant Examiner—Kambiz Zand
(74) Attorney, Agent, or Firm—Oblon, Spivak, McClelland, Maier & Neustadt, P.C.

(57) ABSTRACT

Bit generator for determining a secret encryption key and a corresponding process, the generator having a memory with one memorization cell and measurement and reference bits, and a calculation device connected to the memory, such that a bit applied at an input of the bit generator makes another bit appear at an output thereof. Such a generator is applicable to cryptographic systems and methods.

8 Claims, 2 Drawing Sheets

BIT GENERATOR FOR DETERMINING A SECRET ENCRYPTION KEY AND CORRESPONDING PROCESS

TECHNICAL FIELD

This invention relates to a bit generator for determining a secret encryption key and a corresponding process. Its applications include transmission of secret information. More particularly, it can replace quantum cryptology.

STATE OF PRIOR ART

Mathematicians have always searched for protected communication techniques for transmitting secret information. The principle based on the specific features of quantum mechanics to generate random encoding keys was proposed in the 1970s by Stephen Wiesner [1]. Charles E. Bennett et al contributed to demonstrating the feasibility of the concept [2].

Quantum cryptology is based on the fact that the quantum mechanics measurement is a random and irreversible phenomenon that irrecoverably disturbs the measured object. Thus, interception of the message by a third party will inevitably modify the quantum state of the object so that illegal eavesdropping can be detected, or conversely it is possible to be assured that the message has not been intercepted. In this case, keys that could be used to encode messages later can be transmitted being certain that the key is unique and has been actually kept secret.

The principle used to transmit a decryption key is then as follows.

An operator A (conventionally called Alice in the cryptology specialists language) sends a series of particles with a certain spin, or photons with a certain polarization, to a destination B (conventionally called Bob). Alice has two orthogonal spin measurement reference systems that are denoted a and b. When measured according to reference system a, the spin of a particle is +1 or −1 (in a suitable system of units). If the spin of the same particle is measured for a second time in the same reference system, in this case a, obviously the same value will be found. But if the said spin is measured in the other reference system b, then a random value +1 or −1 will be found independently of the value found in the first measurement.

In a series of successive operations, Alice chooses a series of reference systems a or b at_random. She measures the spin of a new particle in each reference system and sends it to Bob. She notes her choices and the results of her measurements. In turn, Bob chooses a series of reference systems a or b at random, and uses these reference systems to successively measure the spins of the particles that Alice sends to him. He also notes his choices and his results. Obviously, if Bob chose the same reference system as Alice (by chance) which on average would happen in half of all cases, he would find the same result as she did. However if he chose the other reference system, he would obtain a random result compared with the spin measured by Alice. Therefore, if Alice and Bob exchange their choices of reference systems a or b for each particle in a second step, they deduce which were the common choices and which were the series of the +1 or −1 measured spins that they have in common. This series of common spins forms the secret key that they can share.

For security reasons, they can inform each other of part of this key; if this part is actually common, then the message has not been intercepted. Otherwise, they must begin the operation again until they obtain a secret and tested common key.

This technique for determining an encryption key is difficult to use since it requires lasers that emit photons individually, with a particular polarization. The purpose of this invention is to overcome this disadvantage.

DESCRIPTION OF THE INVENTION

Consequently, the invention proposes a device called a bit generator which simulates quantum means according to prior art in a specific manner but uses means that are much easier to implement, such as binary data memories and calculation circuits. This device then no longer works with spins or quantum states, but rather with bits and memory contents which is much more convenient.

According to the invention, one or more memory cells may be used, for example with two bits, with a first bit called the reference system bit, the value of which is denoted a or b (in the case of an environment with two reference systems) and a second bit called the measurement bit denoted +1 or −1. This type of cell may be in one of four logical states, namely (a, +1) or (a, −1) or (b, +1) or (b, −1). The initial state is generated randomly inside the circuit defined by the invention. In order to measure the state of a cell, a reference system bit is applied to it, in other words a or b, and a logical transition of the initial state to a final state is provoked, which is a random type of transition with a certain probability depending on the initial state and the final state and the applied reference system bit. The final state reflects the result of the measurement in the applied reference system.

Therefore, this type of generator has all the attributes of quantum objects and it can be used to determine secret encryption keys.

Naturally, the invention is not restricted to a single cell, or to two bits per cell, but covers all cases of n cells with k bits, where n and k are arbitrary integers.

More precisely, the purpose of this invention is a bit generator for determining a secret encryption key, characterized in that it is composed of an electronic circuit comprising:

an input to which an input signal can be applied comprising a group of n bits, called reference system bits, where n is an integer equal to at least 1, an output on which an output signal can be produced composed of a group of n bits, called the measurement bits, a memory with n memorization cells each memorizing k bits, where k is an integer equal to at least 2, with reference system bits and measurement bits, each cell thus being in a logical state defined by its k bits, this state not being readable from outside the electronic circuit, this memory being provided with an output connected to the output from the generator and outputting measurement bits from the n cells, a calculation means connected to the memory and with one control input connected to the generator input and into which reference system bits are input, this calculation means being capable of provoking a random transition for each cell between the state of the cell called the initial state read on reception of the reference system bit corresponding to the cell, and another state called the final state, the probability of this transition depending on the initial state, the received reference system bit and pre-determined probability equations are defined in the calculation means.

Another purpose of this invention is a process for determining a secret encryption key common to a first user and a second user, this process using the generator described above. This process is characterized in that:

the first user applies a first group of random input bits to the generator input, and collects a first group of output bits at the output from the generator, and then sends the generator to the second user, the second user applies a second group of random input bits to the input of this generator and collects a second group of output bits at the output from the generator, the first user transmits the first group of input bits in plain text to the second user, and the second user transmits the second group of input bits that he used to the first user, in plain text, the first and the second users identify the input bits common to the first and the second group of input bits and determine the bits corresponding to the common input bits in the first and in the second group of output bits, the first and second users use at least part of the output bits corresponding to the common input bits as the common secret encryption key.

Preferably, the first and second users check the output bits corresponding to the common input bits to make sure that the bits in the first group and in the second group are actually identical, and use the remaining bits to build up their common secret key

DESCRIPTION OF PARTICULAR EMBODIMENTS

In the following description, it is assumed that each memorization cell only contains two bits in order to simplify the description. But it is obvious that the invention is not limited to this special case.

Figure 1:
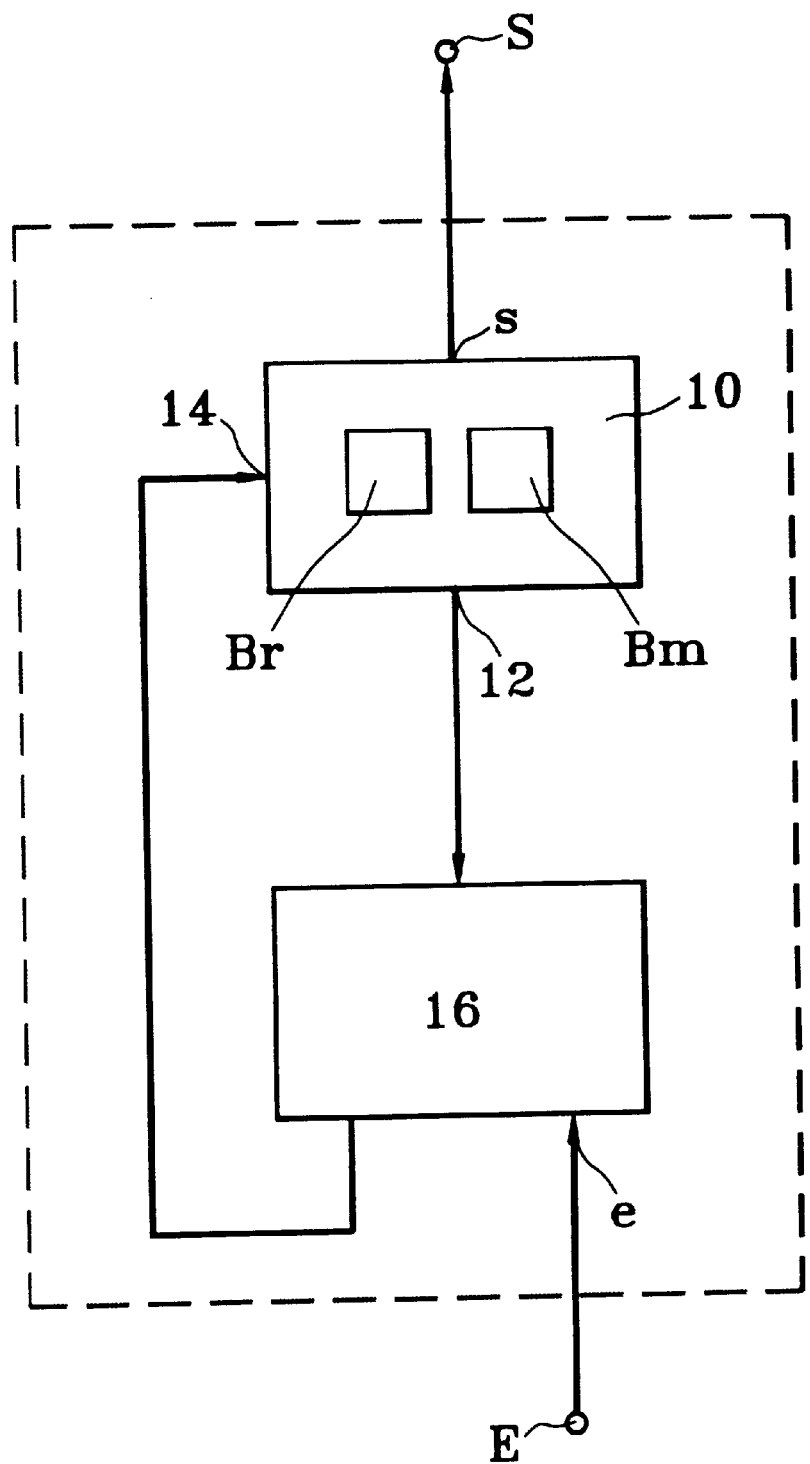
FIG. 1 is a block diagram of a simplified generator according to the invention for a single cell with two bits.

FIG. 1 shows a generator G with one input E and one output S comprising a memory 10 with a single memorization cell. This cell comprises two areas, one $B_r$ that will be used to memorize a reference system bit denoted a or b (in practice it would be +1 or −1, or 1 or 0), and the other $B_m$ will be used to memorize a measurement bit. The memory 10 is provided with a read output 12 and a write input 14. It also has an output s connected to the general output S of the generator. The generator shown also comprises a calculation means 16 connected to the read output 12 and to the write input 14 of the memory. It has a control input e connected to the general input E of the generator.

This generator operates as follows. Initially, it is in an internal state 0 defined by the two bits memorized in the memory (for example a and +1). If a bit is applied to the input E to measure this state, the result of the measurement will depend on the value of the input bit considered as being the reference system bit. If this bit is the same as the reference system bit for the internal state 0 (therefore for the chosen assumption it will be a), the calculation means 16 will initiate a transition making the final state identical to the initial state (in the event (a, +1)). The bit appearing on the output S of the generator will then be the measurement bit for the final state, which will be the same as the measurement bit for the initial state. Therefore, the initial bit will have been correctly measured without disturbing it. It can also be said that the probability of a transition between the initial state (a, −1) and the final state (a, +1) is equal to 1 (consequently, the probability of a transition between the (a, +1) state and the (a, −1) state is zero).

If a reference system bit different from the reference system bit for the state of the cell (in the event b) is applied to the input E, then the measurement reference system will be different from the reference system used to determine the initial state. In this case the result of the measurement is random and depends on the probabilities of a transition between firstly the initial state (a, +1), and secondly either of the (b, +1) and (b, −1) final states. If none of these possible values is given preference, the probabilities will each be equal to ½. Therefore, the measurement bit obtained can, equally well be +1 as −1.

This example can be summarized in table I, in which the top row contains the four possible initial states, the left column contains the four possible final states and the associated boxes contain the transition probabilities.

TABLE I

|          | (a, +1) | (a, −1) | (b, +1) | (b, −1) |
|----------|---------|---------|---------|---------|
| (a, +1)  | 1       | 0       | ½       | ½       |
| (a, −1)  | 0       | 1       | ½       | ½       |
| (b, +1)  | ½       | ½       | 1       | 0       |
| (b, −1)  | ½       | ½       | 0       | 1       |

Naturally, the probabilities of transitions corresponding to different reference system bits could be varied without going outside the framework of the invention.

In practice, an encryption key contains several bits and the memory must contain several cells working independently.

Figure 2:
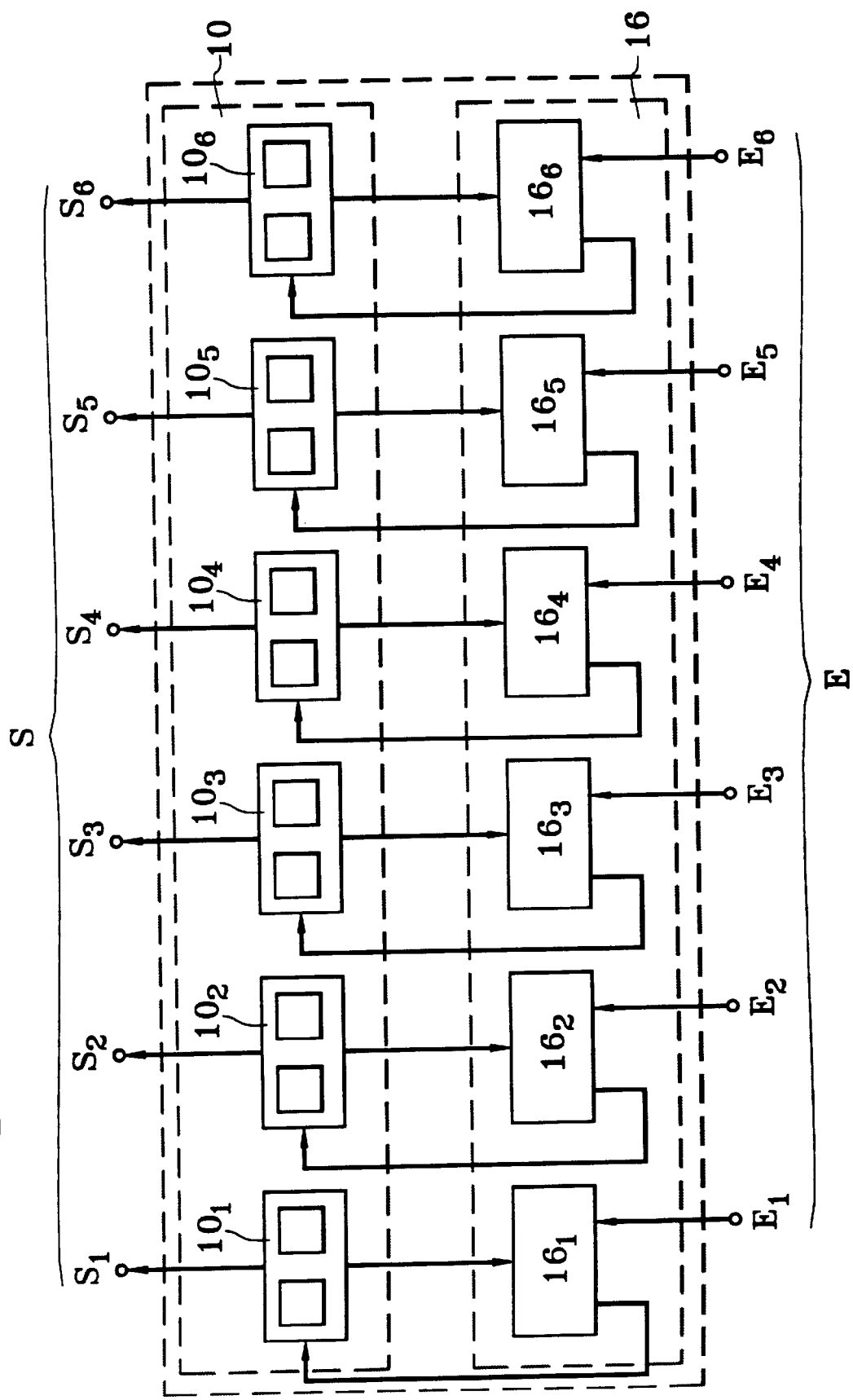
FIG. 2 is a block diagram of a variant with six inputs and four outputs.

Thus, FIG. 2 illustrates the case of a generator using a memory with six memorization cells reference $10_1, 10_2, \ldots, 10_6$. The calculation means 16 comprises six elementary means $16_1, 16_2, \ldots, 16_6$. The generator comprises six inputs $E_1, E_2, \ldots, E_6$ and six outputs $S_1, S_2, \ldots, S_6$, on which there are groups of six bits.

FIG. 2 shows the inputs and outputs laid out in parallel, but a single input and a single output with bits input and output in series and distributed appropriately in the circuit could be used, without going outside the framework of the invention.

Each of the six channels operates like the generator in FIG. 1, these six channels being independent of each other.

Table II illustrates operation of this generator and at the same time shows how two users, Alice and Bob, can set up a common secret encryption key.

TABLE II

|                          | Cell $10_1$ | Cell $10_2$ | Cell $10_3$ | Cell $10_4$ | Cell $10_5$ | Cell $10_6$ |
|--------------------------|-------------|-------------|-------------|-------------|-------------|-------------|
| Internal state 0         | (a, 1)      | (b, −1)     | (b, 1)      | (b, −1)     | (a, 1)      | (a, −1)     |
| Alice's reference system | a           | a           | b           | a           | b           | b           |
| Internal state 1         | (a, 1)      | (a, −1)     | (b, 1)      | (a, 1)      | (b, −1)     | (b, 1)      |
| Alice's measurement      | 1           | −1          | 1           | 1           | −1          | 1           |
| Bob's reference system   | b           | a           | b           | b           | b           | a           |

TABLE II-continued

|  | Cell $10_1$ | Cell $10_2$ | Cell $10_3$ | Cell $10_4$ | Cell $10_5$ | Cell $10_6$ |
|---|---|---|---|---|---|---|
| Internal state 2 | (b, 1) | (a, −1) | (b, 1) | (b, −1) | (b, −1) | (a, 1) |
| Bob's measurement | 1 | −1 | 1 | −1 | −1 | 1 |
| Common key |  | −1 | 1 |  | −1 |  |

In this table, the initial internal state is given on the first row. Alice applies six reference system bits to the generator (row 2). The internal state then changes to state 1 according to the transition probability rules already described. The internal state 1 is shown on row 3. Alice receives the six bits on row 4 as the result of her measurement. The new internal state is consistent with Alice's choice and measurement. Bob received the generator from Alice in its internal state 1 (which is then used as the initial state), and applies six reference system bits to it (row 5). There is no reason why these bits should be the same as the bits used by Alice, but statistically they are the same once out of every two times, in other words in this case, three times (the bits applied to cells $10_2$, $10_3$, $10_5$). The internal state is affected by a transition resulting in the internal state 2 shown on row 6. The result of the measurement made by Bob is shown on row 7. Bob leaves the generator in the internal state 2.

Alice and Bob then exchange the reference system bits used in plain text by any means (rows 2 and 5). They observe that the bits were the same for cells $10_2$, $10_3$ and $10_5$. They alone know the result of the measurement obtained for these common bits, namely −1, 1 and −1. They can use these bits to create the common secret key.

If a fraudulent third party intercepted the card, he would be able to apply his own reference system bit and obtain a result, but once out of every two times the reference system bit would not have been the same as the reference system bit according to the initial state such that this fraudulent measurement would have disturbed the state of the generator. Alice and Bob would realize this by comparing one of these common bits. Naturally, these test bits will be unusable subsequently for the secret key. In the previous example, Alice and Bob can compare the first bit (1) and use the other two bits (+1 and −1) for their common key.

The generator that has just been described may advantageously be placed in an easy to carry portable object, for example a smart card. In this case, it may be sent from Alice to Bob by ordinary mail or registered letter. It is important to note that the smart card forms a tamper-proof sealed object, the contents of which cannot be fraudulently read without destroying the card itself.

But obviously, the generator according to the invention may also be built into more complex transmission circuits.

References:

[1] Wiesner, S., Conjugate Coding, Sigact News, vol. 15, No. 1, 1983, pp.78–88; original handwritten document 1970.
[2] Bennett, C. H., Bessette, F., Brassard, G. Salvail, L. And Smolin, J. Experimental quantum cryptography, Journal or cryptology, vol. 5, No. 1, 1992, pp.3–28 (1992).

What is claimed is:

1. A bit generator composed of an electronic circuit comprising:
   an input to which an input signal is applied comprising a group of n reference system bits, where n is an integer equal to at least 1,
   an output on which an output signal is produced composed of a group of n measurement bits,
   a memory with n memorization cells each memorizing k bits, where k is an integer equal to at least 2, with reference system bits and measurement bits, each cell thus being in a logical state defined by its k bits, this state not being readable from outside the electronic circuit, this memory being connected to the output (S) of the generator and outputting measurement bits from the n. cells,
   calculation means for provoking a transition for each cell in said memory, said calculation means being connected to said memory arid having a control input connected to said input of said bit generator into which reference system bits are input,
   wherein said calculation means is configured -to provoke a random transition for each cell between an initial state read on reception of the reference system bit corresponding to the cell and a final state, the probability of this transition depending on the initial state, the received reference system bit and pre-determined probability equations defined in the calculation means, said bit generator is configured to generate a secret encryption key, and said bit generator is configured to decipher a received secret encryption key.

2. The bit generator according to claim 1, wherein the probability of transition between the initial state and the final state identical to the initial state is equal to 1 when the reference system bit in the input signal is identical to the reference system bit in the initial state.

3. The bit generator according to claim 1, in which the probability of transition between the initial state with a given reference system bit and the final state with a reference system bit different from the reference system bit for the initial state is equal to ½.

4. The bit generator according to any one of claims 1 to 3, in which the electronic circuit is placed in a portable object.

5. The bit generator according to claim 4, in which the portable object is the size of a smart card.

6. The bit generator according to claim 1, in which the input and the output may receive and output groups of bits in parallel.

7. Process for determining the secret encryption key common to a first user and a second user, this process using the bit generator according to claim 1, wherein:
   the first user applies a first group of random input bits to the generator input, and collects a first group of output bits at the output from the generator, and then sends the output from the generator to the second user,
   the second user applies a second group of random input bits to the input of the generator and collects a second group of output bits at the output front the generator,
   the first user transmits the first group of input bits in plain text to the second user, and the second user transmits the second group of input bits to the first user, in plain text,
   the first and the second users identify the input bits common to the first and the second group of input bits and determine the bits corresponding to the common input bits in the first and in the second group of output bits,
   the first and second users use at least part of the output bits corresponding to the common input bits as the common secret encryption key.

8. The process according to claim 7, in which the first and second users check the output bits corresponding to the common input bits to make sure that the bits in the first group and in the second group are actually identical, and use the remaining bits to build up their common secret key.

* * * * *